United States Patent [19]

Drocco

[11] Patent Number: 4,919,539

[45] Date of Patent: Apr. 24, 1990

[54] KNEADING MACHINE, PARTICULARLY FOR FOOD PRODUCTS

[75] Inventor: Amabile Drocco, Alba, Italy

[73] Assignee: Jacobacci-Casetta & Perani, Turin, Italy

[21] Appl. No.: 375,734

[22] Filed: Jul. 5, 1989

[30] Foreign Application Priority Data

Jul. 5, 1988 [IT] Italy ............................... 53277/88[U]

[51] Int. Cl.$^5$ .......................................... B28C 1/16
[52] U.S. Cl. ......................................... 366/94; 366/224
[58] Field of Search ...................... 366/69, 70, 71, 92, 366/93, 94, 95, 220, 221, 224, 223

[56] References Cited

U.S. PATENT DOCUMENTS

| 2,808,239 | 10/1957 | Reiffen | 366/94 |
| 4,765,746 | 8/1988 | Puig | 366/95 |
| 4,854,715 | 8/1989 | Eirich | 366/94 |

Primary Examiner—Robert W. Jenkins
Attorney, Agent, or Firm—Christie, Parker & Hale

[57] ABSTRACT

A kneading machine includes a plurality of kneading tools (13) cooperating with a counter-member (14) which is rotatably supported around an axis spaced from the axis of rotation (8) of the bowl (4).

4 Claims, 4 Drawing Sheets

KNEADING MACHINE, PARTICULARLY FOR FOOD PRODUCTS

The present invention relates to kneading machines for food products, particularly flour mixtures, of the known type comprising:

a kneading bowl which is rotatable about a first substantially vertical axis, a kneading tool which is rotatable within the kneading bowl about a second substantially vertical axis, spaced from said first axis, and a counter-member supported within the bowl and separate therefrom, for creating a dough-free space in the center of the bowl when the dough is rotated by the bowl.

Kneading machines for food products which have rotatable bowls and kneading tools rotatable about vertical axes have been known and used for some time. The kneading tool is usually spiral-shaped and machines of this type are commonly known as spiral kneading machines. In the spiral kneading machines of conventional type, the rotation of the bowl gradually brings the various portions of the dough into correspondence with the spiral kneading tool which is supported for rotation about a vertical axis spaced from the axis of rotation of the bowl. The direction of the rotation of the bowl is identical to the direction of rotation of the kneading tool.

The kneading machines of the aforesaid conventional type have the disadvantage that they cause excessive heating of the dough with resulting physico-chemical changes in the dough which compromise the subsequent leavening and baking stages. The time required for the kneading is also relatively long and this, amongst other things, contributes to the increase in the degree of overheating of the product.

In an attempt to resolve this problem, a kneading machine for food products of the type indicated at the beginning of the present description has been proposed in the past. This machine differs from a conventional machine in that it includes a counter-member supported in a fixed position within the rotatable bowl at a certain distance from the axis of rotation of the bowl and adjacent to the kneading tool. The presence of the counter-member means that, in use, an empty dough-free space is created in the central part of the bowl, which enables greater aeration of the dough and therefore a smaller increase in temperature. At the same time, the counter-member acts as a separator for detaching from the tool any dough adhering thereto. However, such known machine, although enabling to avoid the overheating of the dough, does not ensure a satisfactory degree of homogeneity of the product such as not to give raise to problems in the subsequent leavening stage. The reason for this lack of homogeneity consists of the fact that the dough detached from the spiral kneading member by the counter-member is subjected to stretching which gives raise to unevenness in the dough.

In order to overcome the above mentioned inconvenience, the applicant has already proposed in the previous Italian patent application No. 67933-A/87 filed on 3 Nov. 1987 (which was not yet laid open to public inspection at the priority date of the present application) a kneading machine of the type indicated at the beginning of the present description, in which the counter-member has a body having a continuous peripheral wall and is rotatable about a third substantially vertical axis, said kneading machine further comprising means for rotating the counter-member so that the peripheral velocity of the counter-member is equal to the peripheral velocity of the bowl in correspondence with the part of the counter-member which is farthest from the axis of rotation of the bowl. As indicated above, the counter-member acts as a separating member of the dough from the kneading tool and at the same time creates in the central part of the bowl a dough-free space when the dough is rotated by the bowl. Thus the temperature increase of the dough is kept low. At the same time, the velocity of the dough in the region between the kneading tool and the rotating counter-member is identical to the peripheral velocity of that member. The dough is thus not subjected to stretching, so that perfect homogeneity of the produce is ensured.

In order to further improve the said previously proposed machine, by reducing in particular the kneading time, the present invention provides a kneading machine of the type indicated at the beginning of the present description, characterized by the combination of the following features:

the counter-member has a body having a continuous peripheral wall and is rotatable about a third substantially vertical axis, said kneading machine further comprising means for rotating the counter-member so that the peripheral velocity of the counter-member is equal to the peripheral velocity of the bowl in correspondence with the part of the counter-member which is farthest from the axes of rotation of the bowl, the kneading machine comprises at least one further kneading tool which is rotatable around a fourth substantially vertical axis.

The main advantage provided by the kneading machine according to the invention lies in its intensive kneading action which enables the kneading time to be reduced by approximately a half compared with that of conventional machines whilst also causing increased aeration of the product which resists the temperature raise.

In the prior art, there had been already proposed kneading machines comprising more than one kneading tool. For example, French patent No. 820 147 discloses a kneading machine comprising a pair of kneading tools and a central counter member. First of all, said counter-member is arranged at the center of the bowl, so that it is not able to create a dough-free space when the dough is rotated by the bowl. Secondly, the counter-member is not rotatable so that there is not obtained the further advantage of the machine according to the invention lying in that a particularly homogeneous product is obtained. A substantially analogous structure is also disclosed in French patent No. 5495.

Summing up, none of the machines according to the prior art achieve on one side a relevant reduction of the temperature increase of the dough, due to the creation of a dough-free space at the center of the bowl, and on the other side a high homogeneity of the product, due to the rotation of the counter-member, and a very reduced kneading time, due to the use of a plurality of kneading tools.

Further characteristics and advantages of the present invention wil become clear from the detailed description which follows with the aid of the appended drawings, provided by way of non-limiting example, in which.

Figure 1:
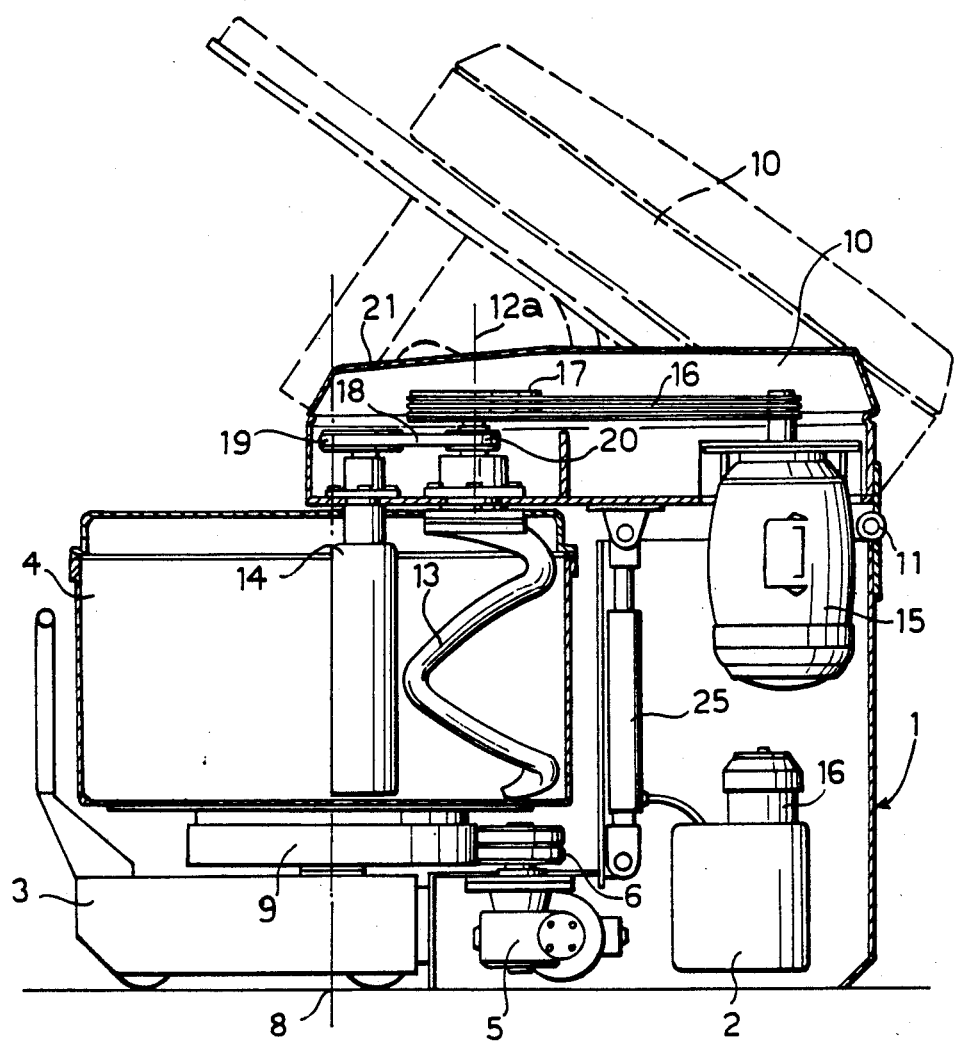
FIG. 1 is a side view of a machine according to the invention.
Figure 2:
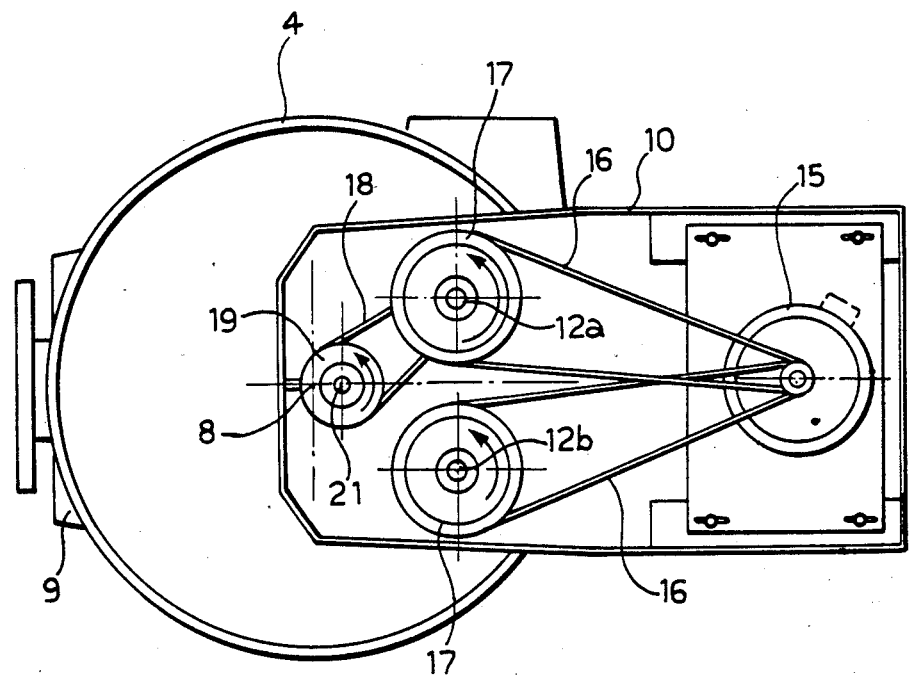
FIG. 2 is a plain view of the machine of FIG. 1.

With reference to FIGS. 1–4, a kneading machine comprises a support structure 1 to which a removable trolley 3 carrying a kneading bowl 4 can be connected by means of a hydraulic clamping system, not illustrated, operated by a hydraulic control unit 2. The support structure 1 houses a geared motor unit 5 which acts on a lower portion 9 of the bowl 4 by means of friction wheels 6 to rotate it about its vertical axis 8.

A head structure 10 is articulated to the structure 1 by means of a hinge 11. The head structure 10 is cantilevered over the kneading bowl 4 and supports two spiral kneading tools 13 for rotation about respective vertical axes 12a, 12b and a counter-member 14 which in the illustrated example has a body of cylindrical shape with a continuous peripheral wall. The tools 13 and the member 14 thus extend into the bowl 4 with their lower ends a short distance from its base.

A hydraulic cylinder 25 driven by an electric motor 16 of the control unit 2 enables the head structure 10 to be lifted from its normal working position, in which it projects over the bowl 4, to a partially-tilted position, indicated in broken outline in FIG. 1, in which the kneading tools 13 and the counter-member 14 are out of the bowl 4.

An electric motor 15 rotates the tools 13 by means of transmission belts 16 which engage pulleys 17 keyed to shafts of the tools 13. The counter-member 14 can rotate by virtue of a pulley 19 keyed to its shaft and engaged with a transmission belt 18 whose opposite end passes over a pulley 20 keyed to the shaft of one of the kneading tools 13. The diameters of the pulleys 17 and of the pulley 19 are selected so as to produce the required velocity ratio between the kneading tools 13 and the counter-member 14.

When it is wished to carry out the kneading, it is necessary to clamp the trolley 3 carrying the bowl 4 filled with dough to the support structure 1 and then to lower the head structure 10 so that the kneading tools 13 and the counter-member 14 penetrate the dough. At this point the actual kneading can be carried out by rotation of the tools 13 and of the member 14 by means of the motor 15 and the rotation of the bowl 4 by means of the motor 5.

Tests carried out by the applicant have shown that the machine causes the temperature of the dough to raise by approximately 4°–5° C., whilst the time required for the operation is approximately 2.5–3 minutes, approximately half that required by a conventional machine.

Figure 3:
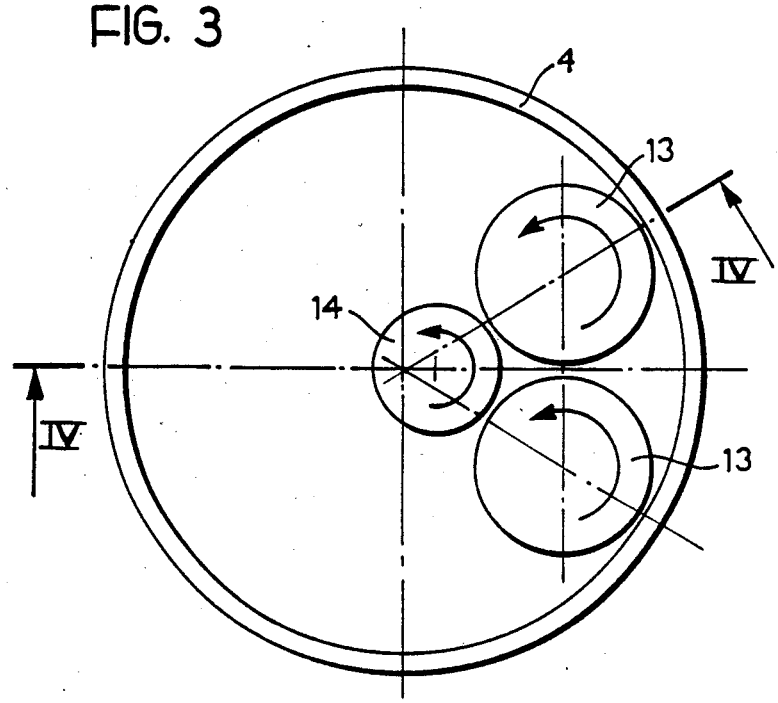
FIGS. 3 and 4 show schematically some elements of the machine illustrated in the preceding drawings.
Figure 4:
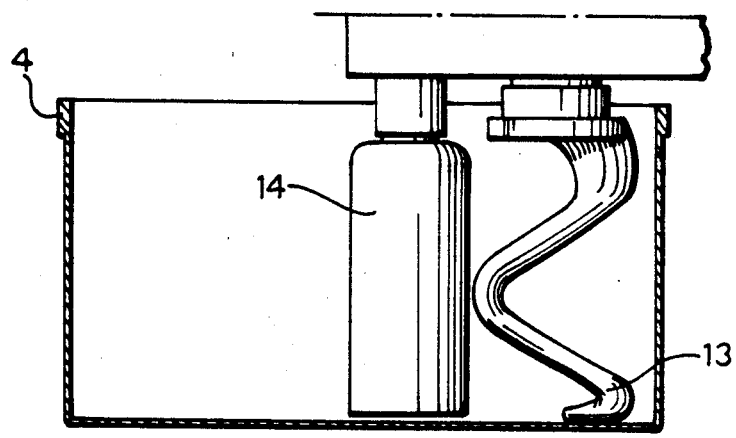

FIGS. 3 and 4 show schematically the arrangement of the kneading tools 13 and the counter-member 14 of the machine just described.

Figure 5:
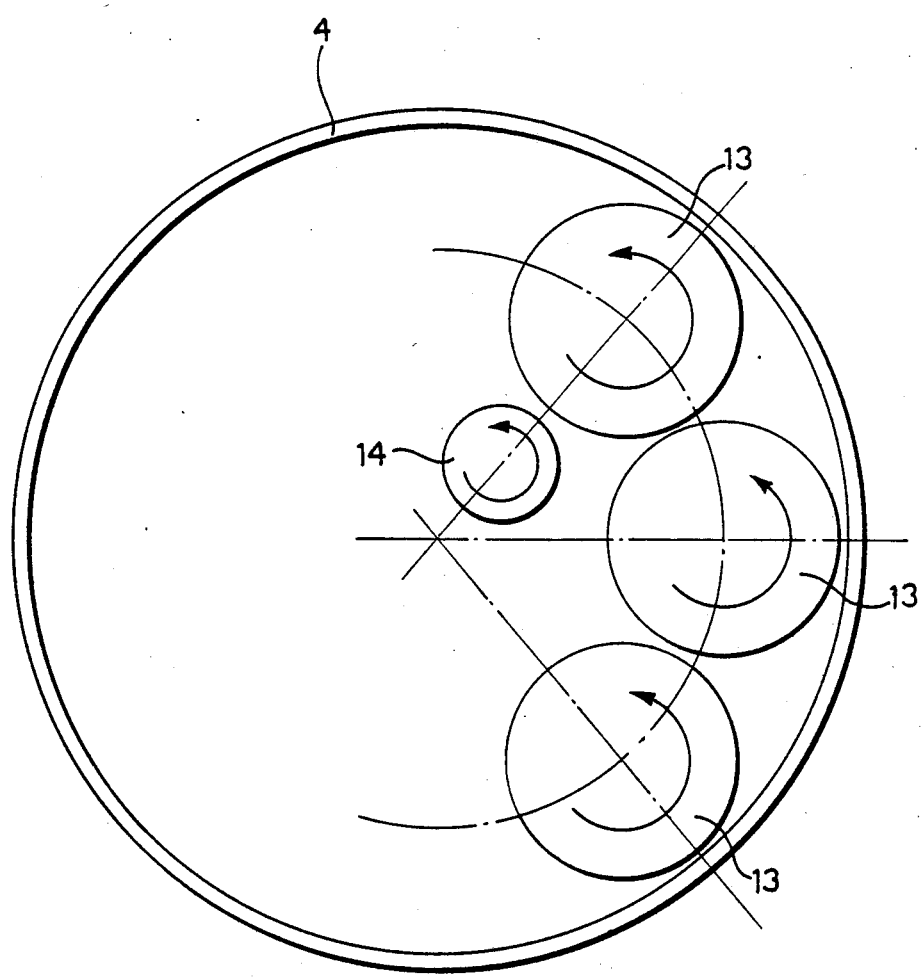
FIG. 5 illustrates schematically some variants of the kneading machine according to the invention.

A variant (FIG. 5) is provided with three kneading tools 13 and one counter-member 14 disposed adjacent to both the kneading tools 13, although closer to one of them.

Naturally, it is possible to provide for a device for detecting the temperature of the dough continuously by means of a probe arranged in contact therewith. The temperatures detected may be displayed visually and supplied to a control system which stops the kneading machine when the dough reaches a particular temperature in order to prevent its alteration. The electric motors of the kneading machine may also be provided with a sine-wave "inverter" system with an acceleration gradient.

A continuously-increasing speed can thus be achieved during the first stage of the kneading, when the ingredients (flour, water, etc. . . . ) must be amalgamated, avoiding the problem of the flour escaping as a result of an unsuitable kneading speed. The operation is thus greatly improved as regards the efficiency of the amalgamation of the ingredients and the time necessary to carry it out.

I claim:

1. Kneading machine for food products, particularly flour mixtures, comprising:

a kneading bowl which is rotatable about a first substantially vertical axis, a kneading tool which is rotatable within the kneading bowl around a second substantially vertical axis, spaced from the first axis, a counter-member supported within the bowl and separated therefrom, for creating a dough-free space in the center of the bowl when the dough is rotated by the bowl, characterized by the combination of the following features:

the counter-member has a body having a continuous peripheral wall and is rotatable around a third substantially vertical axis, said kneading machine further comprising means for rotating the counter-member so that the peripheral velocity of the counter-member is equal to the peripheral velocity of the bowl in correspondence with the part of the counter-member which is farthest from the axis of rotation of the bowl, the kneading machine comprises at least one further kneading tool which is rotatable around a forth substantially vertical axis.

2. Kneading machine as in claim 1, wherein said further kneading tool is also arranged adjacent to said counter-member.

3. Kneading machine as in claim 1, wherein all the kneading tools are driven by a single motor.

4. Kneading machine as in claim 3, wherein said motor rotates also the said counter-member.

* * * * *

UNITED STATES PATENT AND TRADEMARK OFFICE
CERTIFICATE OF CORRECTION

PATENT NO. : 4,919,539

DATED : April 24, 1990

INVENTOR(S) : Amabile Drocco

It is certified that error appears in the above-identified patent and that said Letters Patent is hereby corrected as shown below:

On the Front Page:

[73] Assignee: change "Jacobacci-Casetta & Perani, Turin, Italy" to -- Sancassiano S.p.A., Roddi d'Alba, Italy --.

Column 1, line 54, change "raise" to -- rise --.
Column 1, line 59, change "raise" to -- rise --.
Column 1, line 62, change "patent application" to -- Patent Application --.

Column 2, line 16, change "produce" to -- product --.
Column 2, line 53, change "patent" to -- Patent --.
Column 2, line 63, change "wil" to -- will --.

Column 3, line 51, change "raise" to -- rise --.

In the Claims

Column 4, lines 24-48, delete original claim 1, lines 24-48, and insert therefor amended claim 1 as follows:

-- 1. Kneading maching for food products, particularly flour mixtures, comprising:
a kneading bowl which is rotatable about a first substantially vertical axis;
a kneading tool which is rotatable within the kneading bowl around a second substantially vertical axis, spaced apart from the first axis;

UNITED STATES PATENT AND TRADEMARK OFFICE
CERTIFICATE OF CORRECTION

PATENT NO. : 4,919,539

DATED : April 24, 1990

INVENTOR(S) : Amabile Drocco

It is certified that error appears in the above-identified patent and that said Letters Patent is hereby corrected as shown below:

a counter-member supported within the bowl and separated therefrom, for creating a dough-free space in the center of the bowl when the dough is rotated by the bowl, the counter-member having a body having a continuous peripheral wall and being rotatable around a third substantially vertical axis;
means for rotating the counter-member so that the peripheral velocity of the counter-member is equal to the peripheral velocity of the bowl in correspondence with the part of the counter-member which is farthest from the axis of rotation of the bowl; and
at least one further kneading tool which is rotatable around a fourth substantially vertical axis. --

Signed and Sealed this

Twenty-first Day of January, 1992

*Attest:*

HARRY F. MANBECK, JR.

*Attesting Officer*     *Commissioner of Patents and Trademarks*